United States Patent [19]

Bremer

[11] Patent Number: 5,279,044
[45] Date of Patent: Jan. 18, 1994

[54] MEASURING DEVICE FOR DETERMINING AN ABSOLUTE POSITION OF A MOVABLE ELEMENT AND SCALE GRADUATION ELEMENT SUITABLE FOR USE IN SUCH A MEASURING DEVICE

[75] Inventor: Joannes G. Bremer, Eindhoven, Netherlands

[73] Assignee: U.S. Philips Corporation, New York, N.Y.

[21] Appl. No.: 837,516

[22] Filed: Feb. 18, 1992

[30] Foreign Application Priority Data

Mar. 12, 1991 [EP] European Pat. Off. ......... 91200530.3

[51] Int. Cl.$^5$ ..................... G01B 11/03; G01B 13/03; G01B 13/03
[52] U.S. Cl. ........................ 33/706; 33/707; 356/373
[58] Field of Search ............................... 33/1 L; 706, 707, 710; 250/231.11, 231.13, 250/231.14, 231.15, 237 G; 356/373, 374

[56] References Cited

U.S. PATENT DOCUMENTS

| 3,816,003 | 6/1974 | Litke | 33/707 X |
| 4,786,891 | 11/1988 | Ueda et al. | 33/707 X |
| 5,062,214 | 11/1991 | Gustafsson | 33/706 |

FOREIGN PATENT DOCUMENTS

| 2126444 | 3/1984 | United Kingdom . |
| 2220314 | 1/1990 | United Kingdom . |

OTHER PUBLICATIONS

Electronic Letters vol. 25 No. 21, 12 Oct. 1989 "Incremental Digital Position Encoder With Error Detection And Correction" Herts.

Primary Examiner—William A. Cuchlinski, Jr.
Assistant Examiner—Alvin Wirthlin
Attorney, Agent, or Firm—William L. Botjer

[57] ABSTRACT

The measuring device (1) comprises a scale graduation element (3) provided with a number of tracks (9, 13), a pick-up device (5) which comprises a number of sensing elements (4, 6) provided with sensors, which number corresponds to the number of tracks (9, 13), and also comprises a signal processing system (7). The tracks (9, 13) include an incremental track (9) and an absolute track (13). Both tracks are formed as a succession of strip-shaped parts (11, 15), each of which has a property which can be detected by the sensors of the sensing elements (4, 6). This property is dependent on the location on the scale graduation element (3). This property is preferably bivalent. In the signal processing system (7) signals originating from the sensing element (4) associated with the incremental track (9) and signals originating from the sensing element (6) associated with the absolute track (13) are combined. On the absolute track (13) the property is distributed in a pseudo-random fashion between the strip-shaped parts (15) so that the combination of signals for a pitch (17) of the incremental track (9) produces a specific value for each pitch (17). Consequently, the measurement value produced by the signal processing system (7) is absolute.

5 Claims, 1 Drawing Sheet

MEASURING DEVICE FOR DETERMINING AN ABSOLUTE POSITION OF A MOVABLE ELEMENT AND SCALE GRADUATION ELEMENT SUITABLE FOR USE IN SUCH A MEASURING DEVICE

BACKGROUND OF THE INVENTION

The invention relates to a measuring device for determining an absolute position of a movable element, comprising a scale graduation element with a number of tracks and a pick-up device which comprises a number of sensing elements which corresponds to the number of tracks, said sensing elements being provided with sensors and said tracks including an incremental track and an absolute track and being formed as a succession of strip-shaped parts, each of which has a property which can be detected by the sensors and which is dependent on the location on the scale graduation element, and also comprising a signal processing system for determining the absolute position of the movable element from a combination of, on the one hand, signals originating from the sensors of the sensing element associated with the absolute track and, on the other hand, signals originating from the sensors of the sensing element associated with the incremental track.

The invention also relates to a scale graduation element suitable for use in such a measuring device.

A measuring device of this kind is known from European Patent Application EP 0 246 404 A2. The cited Application describes a measuring device for determining the relative position of two objects, utilizing a scale graduation element in the form of a measuring ruler on which there are provided on the one hand an incremental graduation and on the other hand a graduation of reference marks whereto an absolute position is assigned. This has a drawback in that it is not possible to determine the absolute position without displacing the pick-up device at least as far as the next absolute reference mark. The sensing of the incremental track produces an absolute measure within a pitch, but the resolution of the determination of the absolute value on the measuring ruler is limited by the encoding of the reference marks and the minimum distance that can be achieved between these marks.

SUMMARY OF THE INVENTION

It is an object of the invention to provide an absolute measuring device which has a high resolution and whereby the absolute measuring value can be determined without displacement of the pick-up device.

To achieve this, the measuring device in accordance with the invention is characterized in that the detectable property on the absolute track is distributed between the strip-shaped parts in a pseudo-random fashion, the combination of signals for a pitch of the incremental track having a specific value for said pitch. Thus, each pitch of the incremental track is uniquely encoded. An absolute measurement value can be generated by combination of the absolute measure within a pitch and the unique code of the relevant pitch.

A special embodiment of the measuring device in accordance with the invention is characterized in that the centre lines of the strip-shaped parts of the absolute track are situated at the same distance from one another. The manufacture of the measuring ruler is thus substantially simplified.

A further embodiment of the measuring device in accordance with the invention is characterized in that the detectable property is bivalent. A bivalent property allows for a simple realisation of the tracks and the sensing elements.

A further embodiment of the measuring device in accordance with the invention which comprises a light source is characterized in that a light beam of the light source is incident on a number of light deflection elements which corresponds to the number of tracks, which light deflection elements are arranged at the area of the tracks in order to illuminate the tracks. This offers an advantage in that for optical detection it suffices to use a single light source for illuminating all tracks.

Another embodiment of the measuring device in accordance with the invention is characterized in that the sensing element associated with the absolute track comprises an array of photosensitive sensors. The use of an array of sensors allows for a large number of combinations of the bivalent property. It is essentially the number of sensors which determines the number of possible combinations in the pseudo-random distribution.

A further embodiment of the measuring device in accordance with the invention is characterized in that the incremental track and the absolute track are combined in the scale graduation element so as to form a composite track. The manufacture of the scale graduation element is thus simplified and, moreover, the use of one pick-up device suffices.

BRIEF DESCRIPTION OF THE DRAWING

The invention will be described in detail hereinafter with reference to the drawing.

DESCRIPTION OF THE PREFERRED EMBODIMENTS

Figure 1:
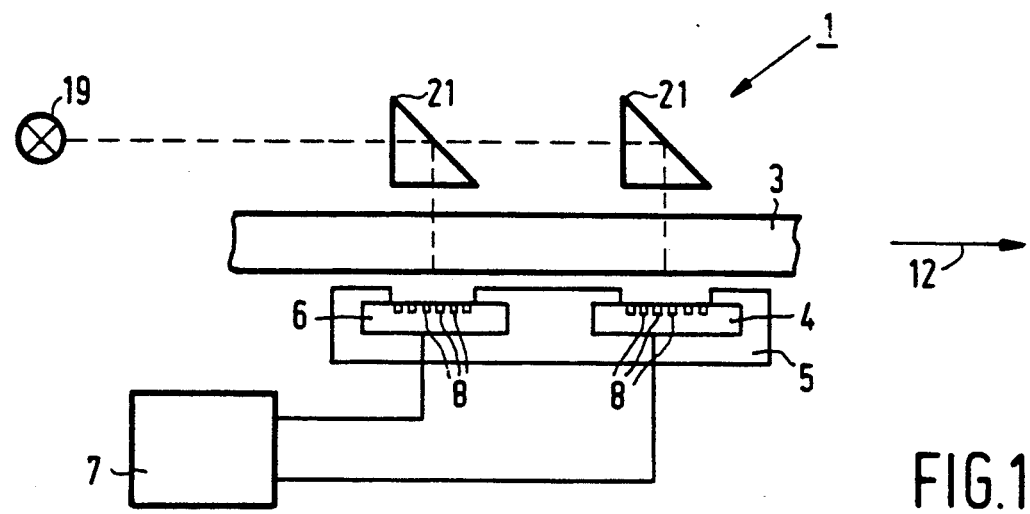
FIG. 1 is a diagrammatic side-elevation of an embodiment of an absolute measuring device in accordance with the invention.

The absolute measuring device 1 shown in FIG. 1 comprises a scale graduation element 3, a pick-up device 5 comprising two sensing elements 4, 6 and a signal processing system 7. Each of the sensing elements 4, 6 is provided with a number of sensors 8 which may be different for each pick-up device 4, 6. During measurement, the scale graduation element 3 and the pick-up device 5 are displaced with respect to one another in a direction as indicated by the arrow 12. The two sensing elements 4 and 6 are situated above and below the plane of drawing, respectively.

Figure 2:
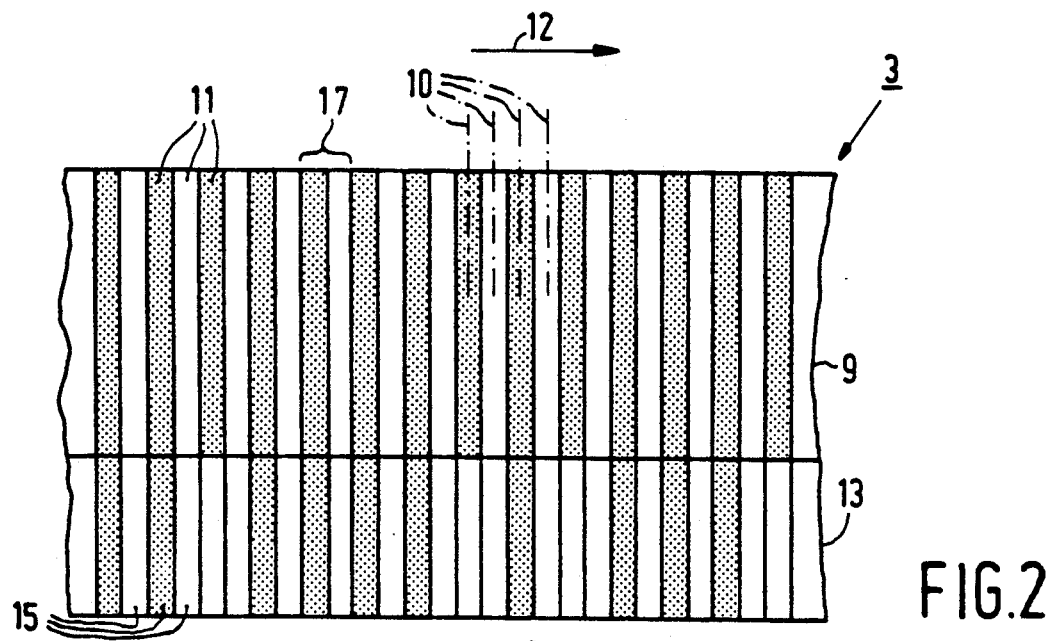
FIG. 2 diagrammatically shows an embodiment of a scale graduation element provided with an incremental track and an absolute track in accordance with the invention.

FIG. 2 shows an embodiment of a scale graduation element 3. The scale graduation element 3 is composed of an incremental track 9 which consists of strip-shaped parts 11. The combined width of two successive strip-shaped parts 11 determines the pitch 17. The direction of displacement of the scale graduation element 3 is again indicated by the arrow 12.

On the scale graduation element 3 there is also provided an absolute track 13. The track 13 is also composed of strip-shaped parts 15. As is customary for incremental tracks, centre lines 10 of the strip-shaped parts 11 are situated at a mutually equal distance from one another on the incremental track 9. In the embodiment shown this is also the case for the strip-shaped parts 15 on the absolute track 13. On both tracks 9, 13 the strip-shaped parts 11, 15 extend in a direction transversely of the longitudinal direction and the direction of displacement 12 of the scale graduation element 3. The strip-shaped parts 11, 15 may alternatively extend at a different angle with respect to the movement direction 12.

Between the strip-shaped parts 11, 15 there is distributed a property which can be detected by the sensors 8 of the sensing elements 4, 6 and which is dependent on the location on the scale graduation element 3. For the sake of simplicity of the composition of the tracks and the overall measuring device 1, this property is preferably bivalent as in the present embodiment. Consequently, properties such as, for example, reflective or not, light-transparent or not, the magnetization condition, and electrically conductive or not are particularly suitable for this purpose. In terms of colours this could be compared to black and white. Another possibility consists in the greater or smaller presence of a given property, corresponding to grey values in the colour image. Furthermore, the property may also be multivalent, which then corresponds to a number of different colours.

On the incremental track 9 the distribution of the property between the strip-shaped parts 11 is such that each strip-shaped part 11 has a property which deviates from the property of its directly neighbouring strip-shaped parts. On the absolute track 13 the presence/absence of the property is distributed between the strip-shaped parts 15 in a pseudo-random fashion. A pseudo-random distribution is to be understood to mean a distribution such that a displacement of the pick-up device 5 over one pitch 17 of the incremental track 9 always produces a specific code for each pitch 17. Combination of this aspect with the absolute measure within a pitch, obtained by the scanning of the incremental track 9, produces an absolute measurement value for the position. In the present embodiment the strip-shaped parts 15 of the absolute track 13 have the same width as the strip-shaped parts 11 of the incremental track 9. However, this is not necessary. The requirement that a displacement over one pitch 17 of the incremental track 9 must produce a unique code can also be satisfied inter alia when a strip-shaped part 15 of the absolute track 13 is twice as wide as a strip-shaped part 11 on the incremental track 9.

If the bivalent property concerns an optical property, for example, light-transparent or reflective, the tracks 9, 13 on the scale graduation element 3 are illuminated. A first possiblity in this respect consists in that each track 9, 13 is illuminated by means of a separate light source 19. A second possibility consists in that at the area of each track 9, 13 there is provided a light deflection element 21 (see FIG. 1), the light originating from a single light source 19 being guided to each track 9, 13 to be illuminated via said elements 21. The light deflection element 21 may be, for example, a prism. The light source 19 may be, for example, a light-emitting diode. The light source 9 and the deflection elements 21 are rigidly connected to the pick-up device 5 and are thus situated below and above the plane of drawing at the area of the respective sensing elements 4 and 6.

After incidence of the light on the tracks 9, 13 via the prism 21, the tracks 9, 13 are sensed by means of the sensing elements 4, 6 forming part of the pick-up device 5.

When the property concerns light transmittance, the scale graduation element 3 is situated between the illumination section 19, 21 and the pick-up device 5. In the case of reflection, the illumination section 19, 21 and the pick-up device 5 are situated to the same side of the scale graduation element 3.

The sensing element 4 for the incremental track 9 may be, for example, a multiple photocell which consists of a row of line-shaped diodes as described in U.S. Pat. No. 3,973,119. The sensing element 6 of the absolute track 13 may also be, for example, a row of line-shaped diodes or an array of photosensitive sensors (for example, type number TC 103, Texas Instruments).

In the present embodiment the array comprises twenty-two sensors. This number determines to a high degree the number of feasible combinations in a sequence of strip-shaped parts 15 having the bivalent property in order to generate a pseudo-random distribution.

Such a pseudo-random distribution can be generated, for example, by means of a combination series as known from the publication "A survey of full length non-linear shift register cycle algorithms" by Harold Fredricksen in SIAM Review, Vol. 24, No. 2, April 1982. The length of such a combination series is given by:

$$M(k,n) = [(k-1)!]^{k^{n-1}} . k^{k^{n-1}-n}$$

$M(k,n)$ is a continuous series containing the number of feasible combinations of a set of n numbers, each of the n numbers being capable of assuming k values. The length of the series increases faster as n is greater. In the case of a bivalent property and a sensing element 6 comprising 22 sensors, $k=2$ and $n=22$. This results in a very large series.

One way of utilizing the pseudo-random distribution of this series will be illustrated on the basis of a numerical example. For example, when a measuring ruler having a length of 12.8 m is to be provided with a unique code every 0.2 mm (=pitch 17), 64,000 different codes must be present. Using 22 sensors and a bivalent property, however, the series contains many more possibilities. If desirable, 64,000 consecutive numbers can be chosen from the series, it being possible to impose given conditions within the sets of 22 numbers. These conditions may imply, for example, that a lower limit is imposed as regards the number of active strip-shaped parts 15 of the absolute track 13; there may also be a desire for detectability and correctability of any detection errors in the pseudo-random distribution.

The composition of such a series will be illustrated with reference to an example where $n=4$. It follows from the above formula that in principle there are 16 possibilities. The requirement that 0 or 1 may succeed one another at the most twice, produces the following series:
0010
0100
1001
0011
0110
1100

Another feasible series is:
0010

```
0101
1010
0100
1001
0011
0110
1101
1011
```

This demonstrates that the choice of the numbers per set affects the length of the series.

The signals originating from the sensing element 4 associated with the incremental track 9 and the signals originating from the sensing element 6 associated with the absolute track 13 are combined in known manner in the signal processing system 7 so as to form an absolute measurement value which is converted into a parallel or a serial output signal. The sensing elements 4, 6 and (a part of) the signal processing system 7 can be mounted together on a common printed circuit board (PCB) (not shown).

Figure 3:
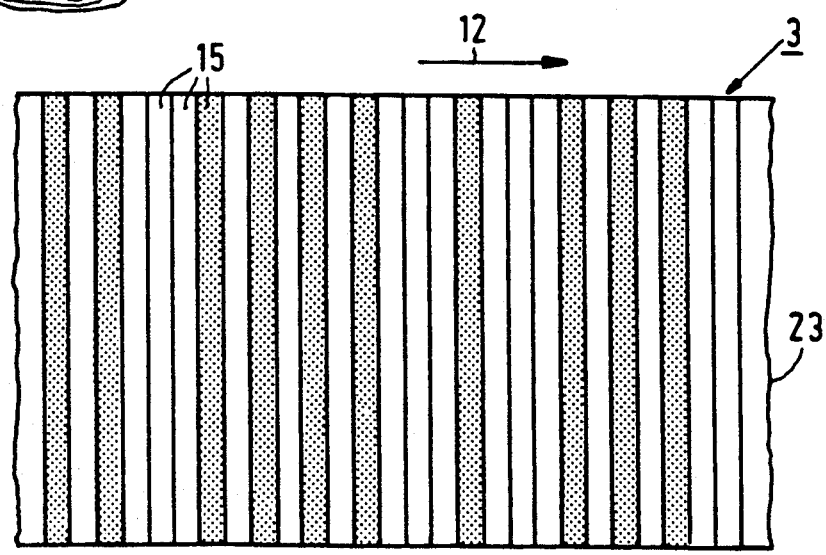
FIG. 3 diagrammatically shows an embodiment of a scale graduation element provided with a composite track in accordance with the invention.

The scale graduation element 3 described thus far is composed of two separate tracks: an incremental track 9 and an absolute track 13. The incremental track 9 is sensed by the pick-up device 5 over a number of pitches 17 simultaneously. This is done in order to remove small irregularities in the pattern by averaging. However, this means that such a pick-up device 5 can also sense the absolute track 13. As a result, the incremental track 9 and the absolute track 13 can be combined so as to form a single composite track 23. A condition to be satisfied in that case consists in that a sufficient number of pitches, for example 75%, must be available in order to ensure that the incremental information present in the composite track can still be recognized. FIG. 3 shows an embodiment of a composite track 23. In this case the two sensing elements 4, 6 can be replaced by a single sensing element, if desired. From a functional point of view, however, two tracks continue to exist.

It will be obvious that the foregoing description of the measurement of linear displacements is also applicable to the measurement of angles.

I claim:

1. A measuring device for determining an absolute position of a movable element, comprising a scale graduation element with a number of tracks and a pick-up device which comprises a number of sensing elements which corresponds to the number of tracks, said sensing elements being provided with multiple sensors and said tracks including an incremental track and an absolute track and being formed as a succession of strip-shaped parts, each of which has a property which can be detected by the sensors without relative displacement of the sensors and strip-shaped parts and which is dependent on the location on the scale graduation element, and also comprising a signal processing system for determining the absolute position of the movable element from a combination of, on the one hand, signals originating from the sensors of the sensing element associated with the absolute track and, on the other hand, signal originating from the sensors of the sensing element associated with the incremental track, characterized in that the incremental track and the absolute track are combined on the scale graduation element so as to form a single composite track and in that the detectable property on the composite track is distributed in a pseudo-random manner such that, the signals for a pitch of the composite track has a value specific for said pitch which is different from that of the other signals.

2. A measuring device as claimed in claim 1, characterized in that the centre lines of the strip-shaped parts of the absolute track are situated at the same distance from one another.

3. A measuring device as claimed in claim 1, characterized in that the detectable property is bivalent.

4. A measuring device as claimed in claim 1, comprising a light source, characterized in that a light beam of the light source is incident on a number of light deflection elements which corresponds to the number of tracks, which light deflection elements are arranged at the area of the tracks in order to illuminate the tracks.

5. A measuring device as claimed in claim 1, characterized in that the sensing element associated with the absolute track comprises an array of photosensitive sensors.

* * * * *